(12) United States Patent
Russo (10) Patent No.: US 7,730,422 B2
(45) Date of Patent: Jun. 1, 2010

(54) SMART ICON PLACEMENT ACROSS DESKTOP SIZE CHANGES

(75) Inventor: Thomas P Russo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 11/338,851

(22) Filed: Jan. 25, 2006

(65) Prior Publication Data

US 2007/0174782 A1  Jul. 26, 2007

(51) Int. Cl.
*G06F 3/048* (2006.01)

(52) U.S. Cl. .................. 715/815; 715/788; 715/799; 715/800; 715/810; 715/833

(58) Field of Classification Search .......... 715/781, 715/835, 764, 765, 788, 810, 815, 833, 834, 715/799, 800
See application file for complete search history.

(56) References Cited

U.S. PATENT DOCUMENTS

| | | | | |
|---|---|---|---|---|
| 4,542,377 | A * | 9/1985 | Hagen et al. ............... | 345/659 |
| 5,432,720 | A * | 7/1995 | Lucente et al. ............. | 361/681 |
| 5,434,964 | A * | 7/1995 | Moss et al. ................ | 715/788 |
| 5,497,454 | A * | 3/1996 | Bates et al. ................ | 715/799 |
| 5,544,301 | A * | 8/1996 | Orton et al. ................ | 715/798 |
| 5,553,225 | A * | 9/1996 | Perry ........................ | 715/786 |
| 5,704,050 | A * | 12/1997 | Redpath .................... | 715/764 |
| 5,774,233 | A * | 6/1998 | Sakamoto .................. | 358/451 |
| 5,796,401 | A * | 8/1998 | Winer ....................... | 345/619 |
| 5,801,699 | A * | 9/1998 | Hocker et al. .............. | 715/837 |
| 5,825,675 | A * | 10/1998 | Want et al. ................. | 708/142 |
| 5,883,625 | A * | 3/1999 | Crawford et al. ........... | 715/788 |
| 5,936,619 | A * | 8/1999 | Nagasaki et al. ........... | 345/205 |
| 5,949,408 | A * | 9/1999 | Kang et al. ................ | 345/169 |
| 6,043,817 | A * | 3/2000 | Bolnick et al. .............. | 715/788 |
| 6,115,025 | A * | 9/2000 | Buxton et al. .............. | 345/659 |
| 6,137,468 | A * | 10/2000 | Martinez et al. ........... | 345/649 |
| 6,144,974 | A * | 11/2000 | Gartland .................... | 715/205 |
| 6,215,502 | B1 * | 4/2001 | Ferguson ................... | 345/648 |
| 6,262,769 | B1 * | 7/2001 | Anderson et al. ......... | 348/333.1 |
| 6,323,879 | B1 * | 11/2001 | Sauerbrei ................... | 345/672 |
| 6,400,851 | B1 * | 6/2002 | Shih ......................... | 382/297 |
| 6,411,274 | B2 * | 6/2002 | Watanabe et al. .......... | 345/684 |
| 6,462,759 | B1 * | 10/2002 | Kurtzberg et al. .......... | 715/803 |
| 6,486,896 | B1 * | 11/2002 | Ubillos ...................... | 715/784 |
| 6,518,956 | B1 * | 2/2003 | Sato ......................... | 345/173 |
| 6,781,587 | B2 * | 8/2004 | Grigor ...................... | 345/533 |
| 6,919,890 | B2 * | 7/2005 | Halstead, Jr. ............... | 345/440 |

(Continued)

*Primary Examiner*—Ba Huynh
*Assistant Examiner*—Eric Wiener
(74) *Attorney, Agent, or Firm*—Workman Nydegger (57) ABSTRACT

Intelligent rearrangement of icons on a desktop in response to changes in desktop size, such as orientation, may be provided using a number of approaches. Desktop area in multiple orientations may be divided into a grid having equal numbers of rows and columns, and placement of icons in each orientation may use common grid coordinates. Icons may alternatively be reflected along a diagonal of desktops in different orientations, such that some icon positional relationships may be maintained. Placement of icons on a desktop may be restricted to a predefined subset region of the desktop, where the subset region will fit in multiple orientations without requiring adjustment. Additionally, areas of a desktop in multiple orientations may be reserved for predefined types of icons, and changes in orientation may result in placement of icons in corresponding reserved areas based on icon attribute.

12 Claims, 11 Drawing Sheets

U.S. PATENT DOCUMENTS

| | | | |
|---|---|---|---|
| 6,922,816 B1 * | 7/2005 | Amin et al. | 715/833 |
| 7,002,604 B1 * | 2/2006 | Barrus et al. | 345/649 |
| 7,027,033 B2 * | 4/2006 | Koo | 345/158 |
| 7,058,902 B2 * | 6/2006 | Iwema et al. | 715/810 |
| 7,134,093 B2 * | 11/2006 | Etgen et al. | 715/786 |
| 7,184,025 B2 * | 2/2007 | Williams et al. | 345/169 |
| 7,233,341 B1 * | 6/2007 | Sauerbrei | 345/672 |
| 7,256,767 B2 * | 8/2007 | Wong et al. | 345/158 |
| 7,284,209 B2 * | 10/2007 | Jones et al. | 715/856 |
| 7,298,926 B2 * | 11/2007 | Prakash | 382/298 |
| 7,430,713 B2 * | 9/2008 | Kobashi et al. | 715/244 |
| 7,441,204 B2 * | 10/2008 | Thomson et al. | 715/827 |
| 7,577,923 B2 * | 8/2009 | Beam et al. | 715/840 |
| 2005/0099425 A1 * | 5/2005 | Garritsen | 345/520 |
| 2005/0114788 A1 * | 5/2005 | Fabritius | 715/767 |
| 2005/0125736 A1 * | 6/2005 | Ferri et al. | 715/747 |
| 2006/0146059 A1 * | 7/2006 | Inoue et al. | 345/546 |
| 2006/0187203 A1 * | 8/2006 | Piraneque et al. | 345/158 |

* cited by examiner

SMART ICON PLACEMENT ACROSS DESKTOP SIZE CHANGES

BACKGROUND

In today's digital world, the use of graphical user interfaces (GUIs) to display and manage computer information has become ubiquitous. For example, the WINDOWS™ (Microsoft Corporation, Redmond, Wash.) operating systems used in many personal computers employs a GUI desktop with various icons or indicia representing objects on the computer system. The icons may represent applications, data files, hardware components, shortcuts to Internet addresses, and any variety of other data.

For many users, the GUI desktop is a convenient location for temporary (or even permanent) storage of icons representing applications and data that the users wish to have available as they go about their daily business. Managing the arrangement of these icons, however, can become difficult if a large number of icons are displayed, as individual icons can quickly become lost in a sea of other icons.

The problem becomes even worse when the user makes changes to the GUI desktop. For example, today's display monitors often allow changes in orientation to switch from landscape to portrait mode, or vice versa. Making such size changes alters the orientation of the usable space on the GUI desktop, and can disrupt the user's icon organization, making it more difficult for the user to function. Accordingly, there is a need for an intelligent management of desktop items that can account for such changes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A desktop may be configured to intelligently allocate placement of icons when changing orientations. The desktop may be divided in a first orientation into a first grid having an equal number of rows and columns of cells, and placement of icons may be restricted to the cells. When the desktop orientation is changed, such as by rotating 90 degrees between landscape and portrait modes, the desktop in the second orientation may be divided into a similarly-dimensioned grid, and the icons in the desktop may have the same grid coordinates in the first and second orientations.

The rows and columns may be adjusted in spacing and/or size based on the change in orientation. For example, icons may be centered in their respective cells. Similarly, the icons themselves may be adjusted in appearance, such as by changing their height and/or width, or modifying text accompanying the icon.

Alternatively, a diagonal line may be defined across desktops in two orientations, and when switching from one orientation to another, icons on the desktop may be reflected about this diagonal. The reflection may be accomplished by exchanging X- and Y-icon coordinates, such that rows become columns and vice versa.

As another alternative, a subregion may be defined on the desktop, such that the dimensions of the subregion fit within the smallest edge of each of the orientations. For example, a square subregion may be defined, having an edge length that fits within the height of the desktop when in portrait mode. Icon placement may be restricted to within this subregion, and upon a change in orientation, the subregion may be reproduced without alteration in the new orientation.

As yet another alternative, regions on a desktop may be reserved for one or more icon types, such as icons for different file types. Corresponding regions may be defined for multiple orientations, and changing between orientations may result in moving icons between corresponding regions.

These and other features will be described in greater detail below.

DETAILED DESCRIPTION

Figure 1:
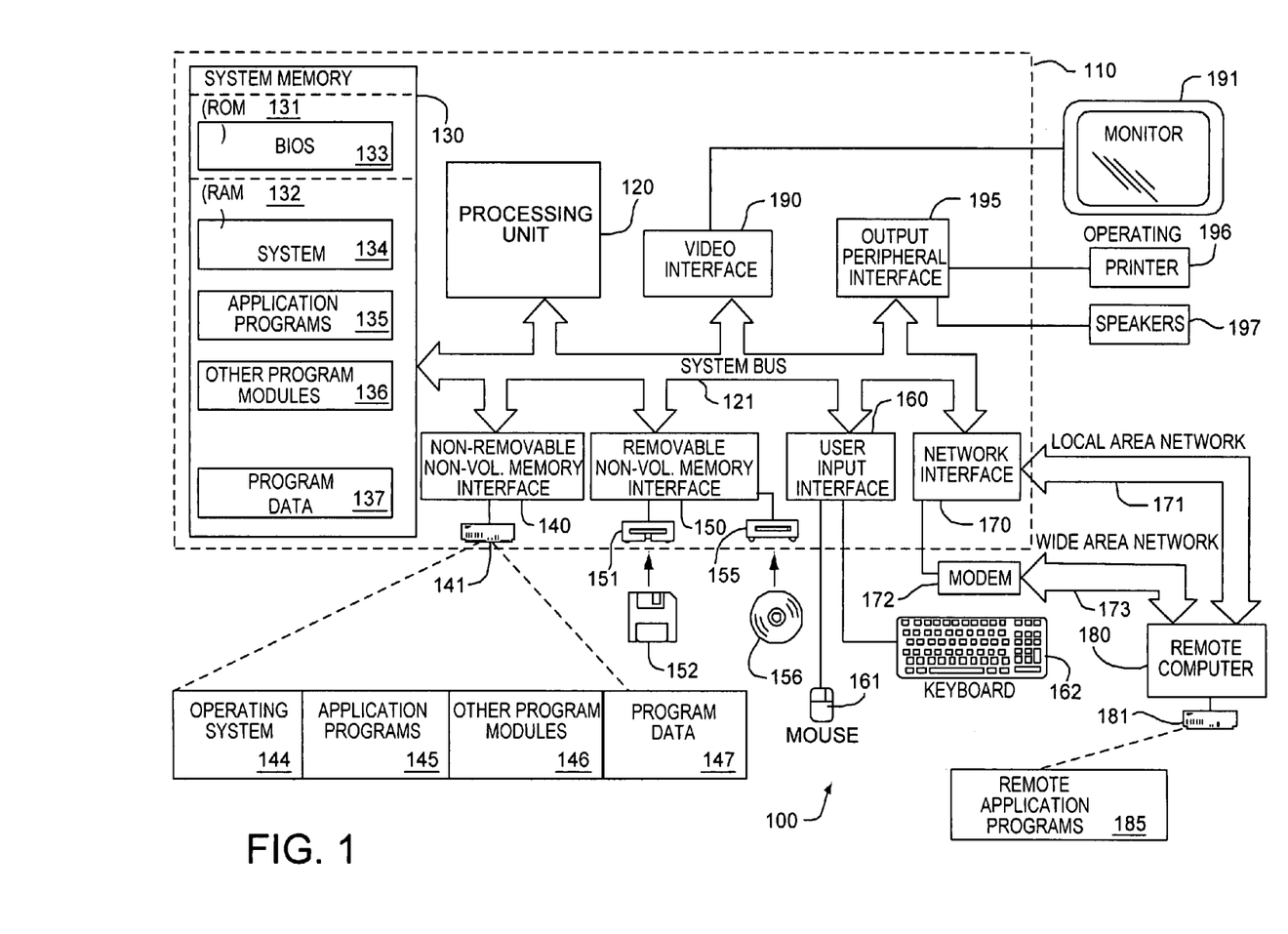
FIG. 1 illustrates an example of a computing system environment.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131: RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
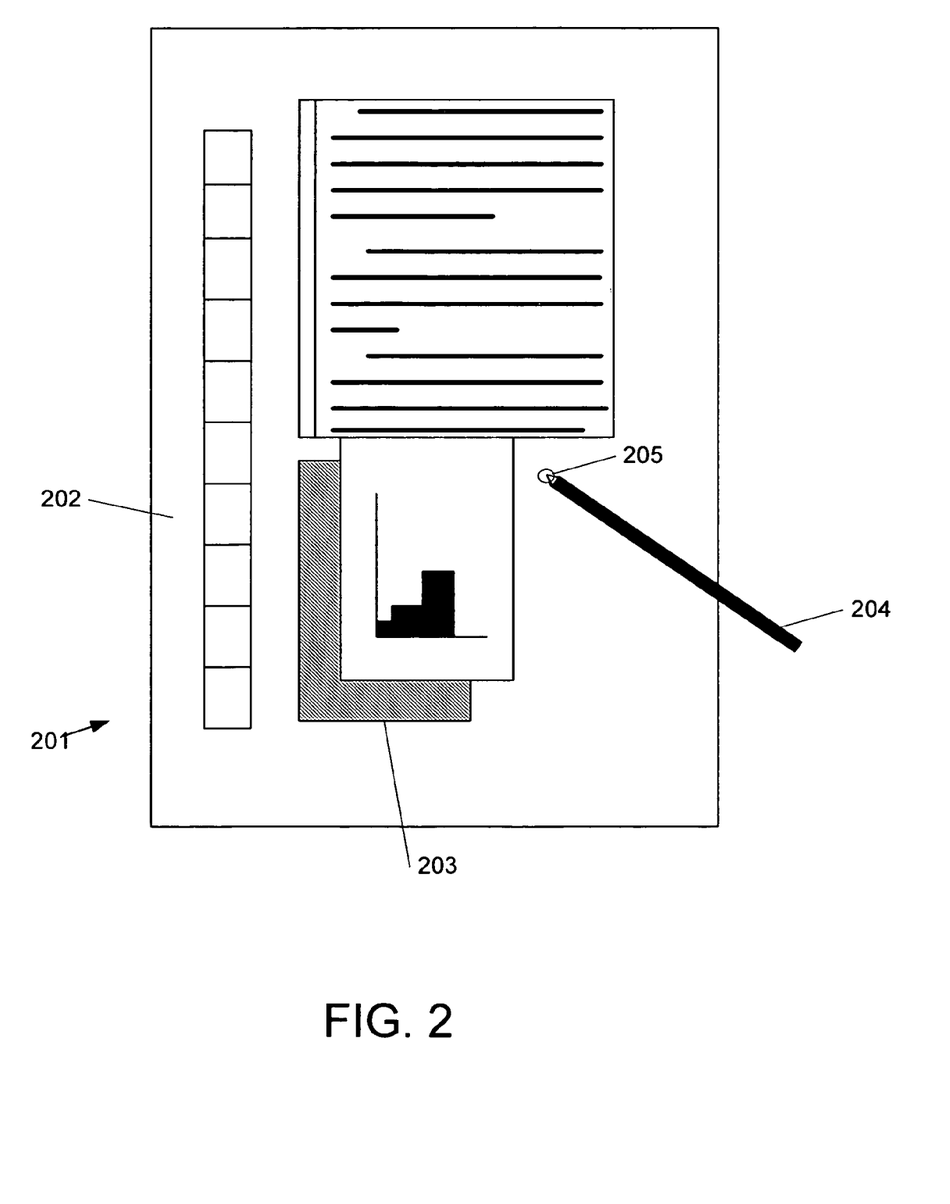
FIG. 2 illustrates an example of a tablet-type computing environment and interface.

FIG. 2 illustrates an illustrative tablet PC 201 that can be used in accordance with various aspects described herein. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., resistive, capacitive, or optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Figure 3:
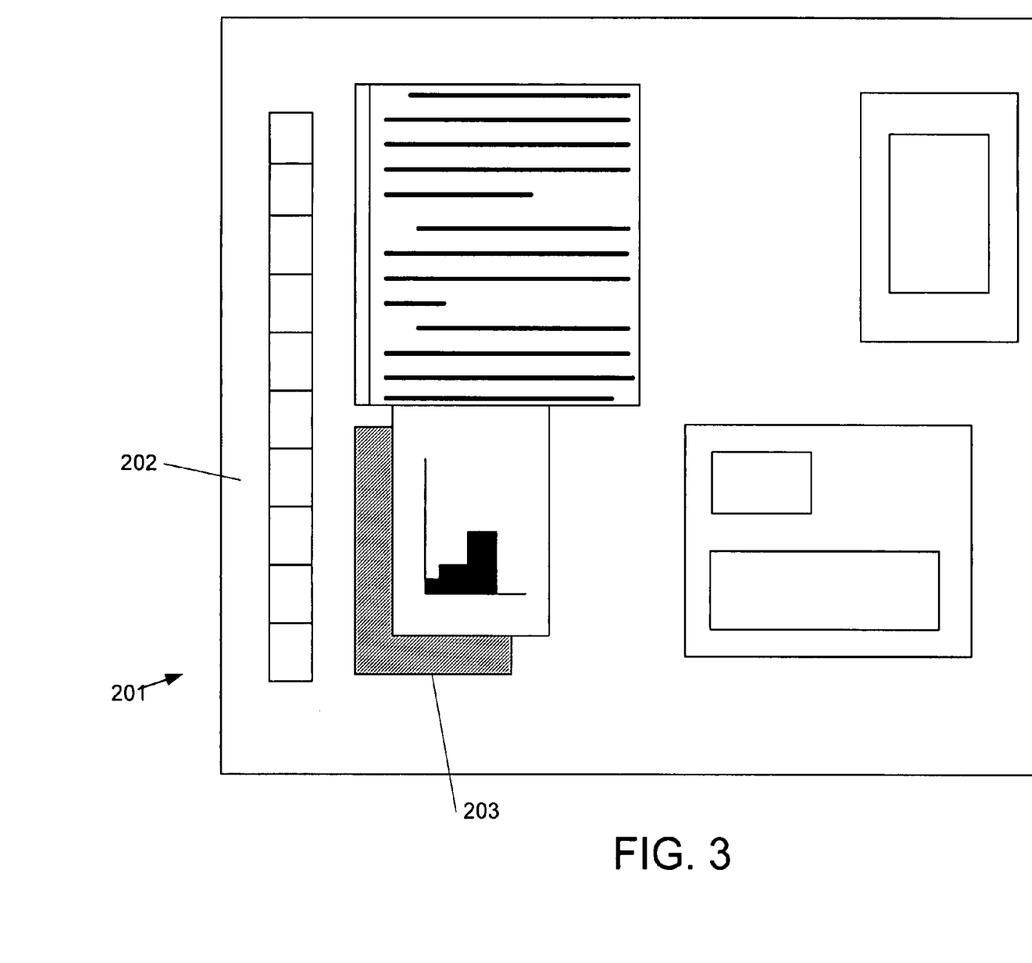
FIG. 3 illustrates another example of a tablet-type computing environment and interface, having a different orientation from that shown in FIG. 2.

FIG. 3 illustrates a second orientation for the tablet PC shown in FIG. 2. In the FIG. 3 orientation, a rectangular landscape presentation is used, as opposed to the rectangular portrait orientation shown in FIG. 2. A landscape presentation may offer a GUI desktop that is wider, but shorter, than the presentation offered in the portrait mode.

Figure 4A:
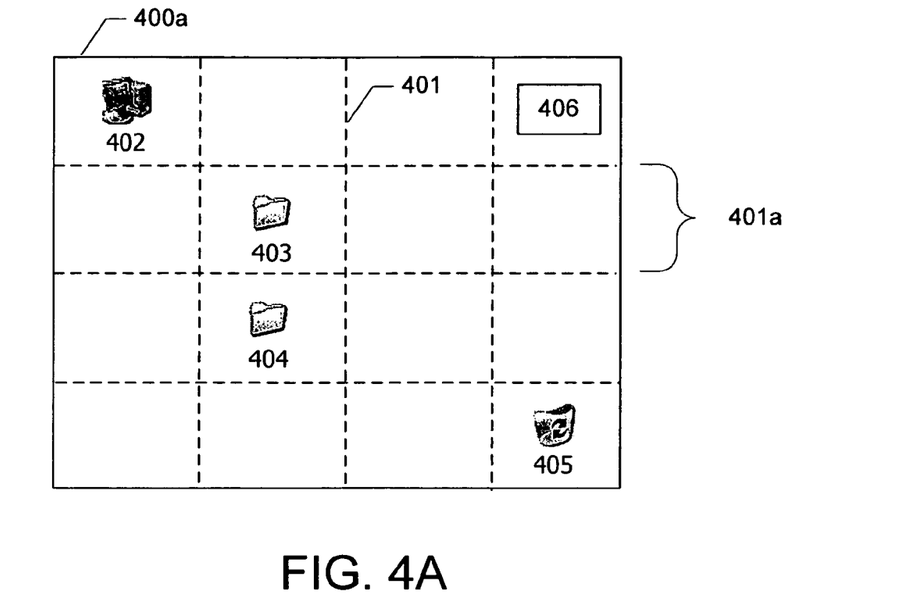
FIGS. 4a-c illustrate GUI desktops and an example process for an approach to handling changes in desktop orientation.
Figure 4B:
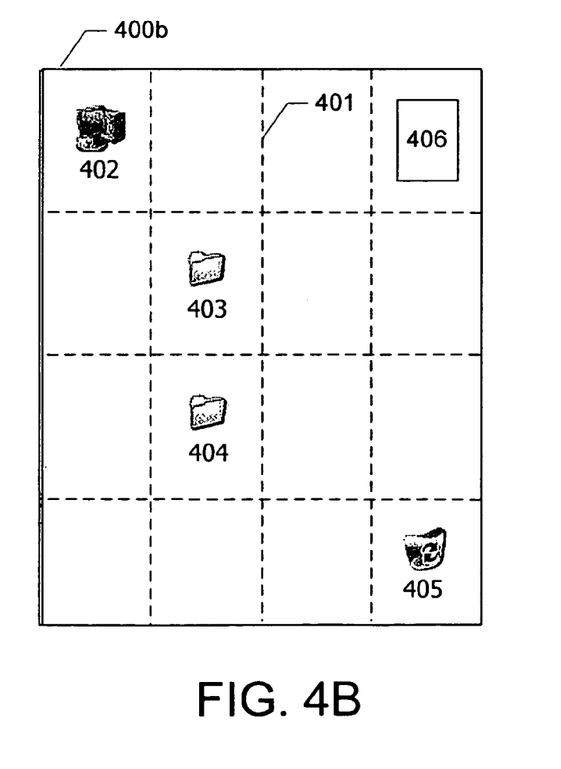
Figure 4C:
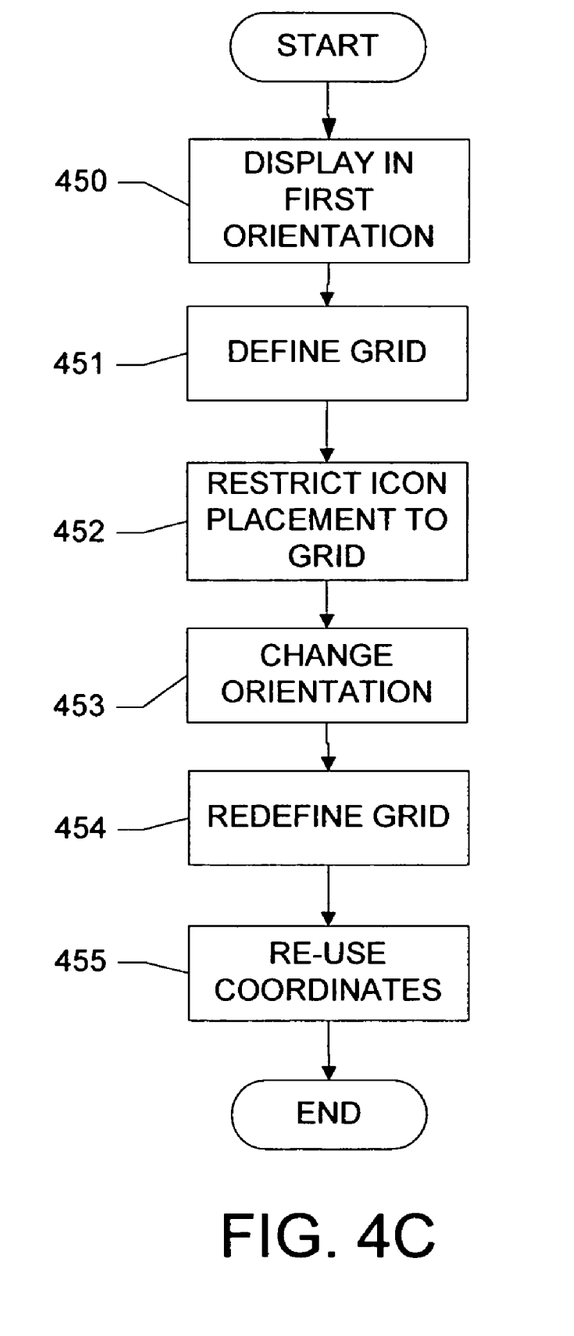

FIGS. 4a and 4b illustrate steps that may be taken to help manage changes between display sizes or orientations, such as between landscape and portrait modes. These steps are also shown in the flow diagram of FIG. 4c, all of which will be described below. First, as shown in FIG. 4a and in step 450 of FIG. 4c, a GUI desktop 400a is shown in a first landscape mode. To manage placement of icons on the desktop 400a, a grid 401 of cells (areas or spaces) 401a on the desktop 400a may be defined in step 451. The grid 401 may divide the desktop area into cells 401a, and may have an equal number of rows and columns of cells 401a. For example, the grid 401 is shown having 4 rows and 4 columns of cells. Although 4 are shown, any other number of rows and columns may be used, depending on user preference.

The actual creation of the grid 401 (which can be displayed, or can be kept invisible) can be accomplished in a number of ways. For example, the grid may be defined through user-entered criteria. The user may be prompted to enter the number and/or size of cells, rows, columns, etc., to define a corresponding grid. Alternatively, the grid may be automatically defined using a predetermined number (e.g., 4, 5, 6, 7, 8, 9, 10) of rows and columns. For example, the system may automatically define the number of rows and/or columns based on the resolution of the display, the number of icons on the desktop, the size of icons, etc.

With the grid 401 defined, the grid may then be used in step 452 to restrict the placement of icons on the desktop. For example, the system may only permit icons to be placed in cells 401a of the grid, and may only permit a certain number of icons (e.g., 1, 2, 3, etc.) per cell. Accordingly, the system may prohibit placement of an icon in a location outside of the grid 401, such that all desktop icons 402-406 are placed in the cells 401a of the grid 401.

As icons 402-406 are added to the desktop in step 452, the computer system may maintain in memory a data table (or any desired type of data structure) of values identifying coordinates in grid 401 for the placement of various icons. For example, the system icon 402 may be given coordinates of (1,1) to indicate that it is in the first position of the first row of the grid 401. These coordinates may be used when the orientation changes, as discussed below.

In step 453, the desktop orientation may be changed to a different orientation, such as a portrait orientation. In response to this change in orientation, and as shown in FIG. 4b, when the desktop orientation is changed, e.g., by rotating 90 degrees, the square grid 401 is also redefined in step 454 as being rotated along with the desktop such that the grid columns become rows and the grid rows become columns. As part of this grid rotation, various cells within the grid may have their heights and widths swapped (e.g., former heights become current widths) to reflect the rotation of the grid. However, the rotated square grid 401 still defines a grid having X columns and rows, so when redrawing the screen in step 455 after the change in orientation, the placement of the icons 402-406 may still use the same coordinates defined earlier. In this way, the icons have common grid coordinates between the orientations.

When using the square grid 401 to place icons in step 455, the spacing of the icons 402-406 may be adjusted based on dimensions of the grid cells 401a to present a more uniform appearance in the display mode. For example, the icons may each be centered in their respective cell 401a. Accordingly, while icons may be spaced farther apart horizontally in landscape mode (e.g., FIG. 4a), the icons may be spaced farther apart vertically in portrait mode (e.g., FIG. 4b). Icons themselves may also change in response to the change in modes. For example, an icon 406 may have dimensions that are proportionate to the dimensions of the desktop, such that in landscape mode, an icon is wide and short, while in portrait mode an icon is tall and skinnier. Other aspects of the icons may change as well, such as choice of image, choice of text, placement of text, orientation of text, etc. In some instances, an application on the computer system may define how its representative icon will appear in the different orientations.

Figure 5A:
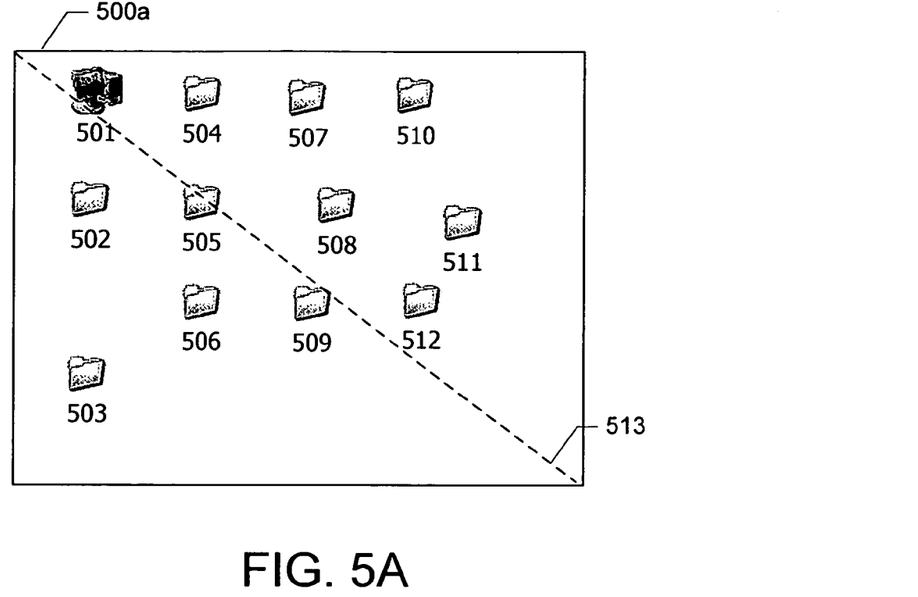
FIGS. 5a-e illustrate GUI desktops and an example process for another approach to handling changes in desktop orientation.
Figure 5B:
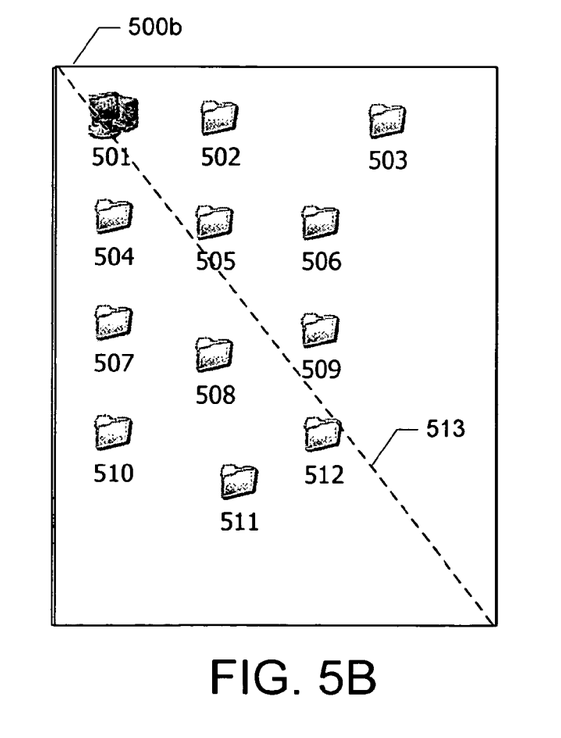
Figure 5C:
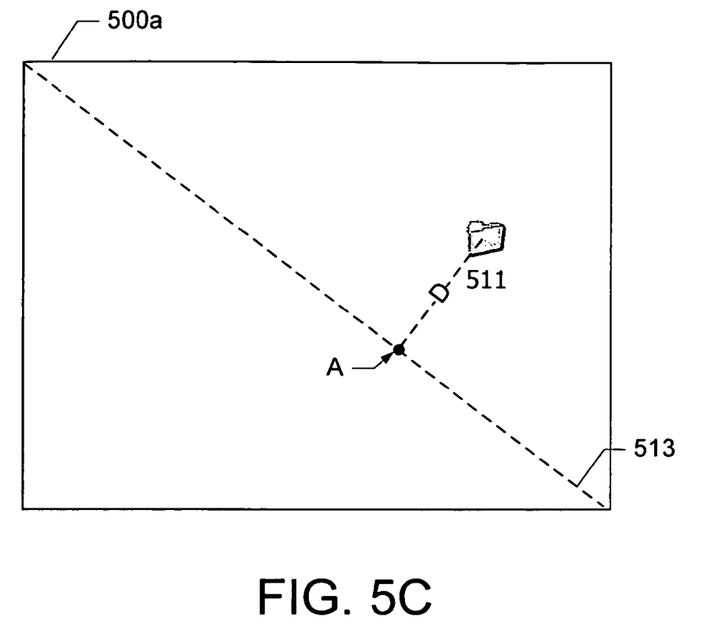
Figure 5D:
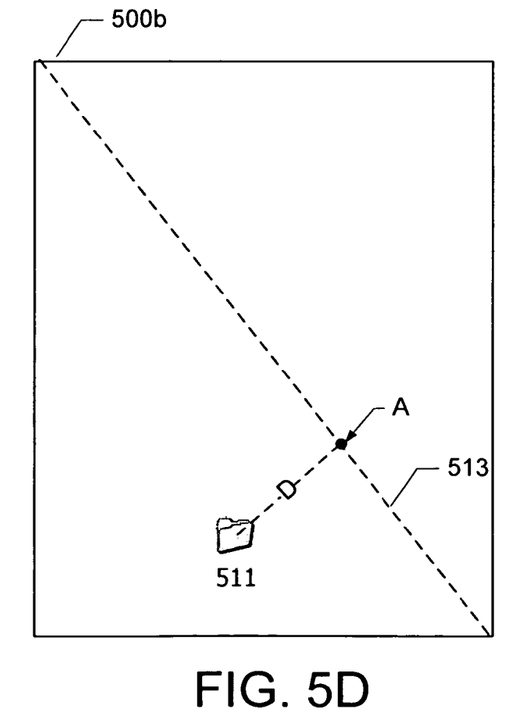
Figure 5E:
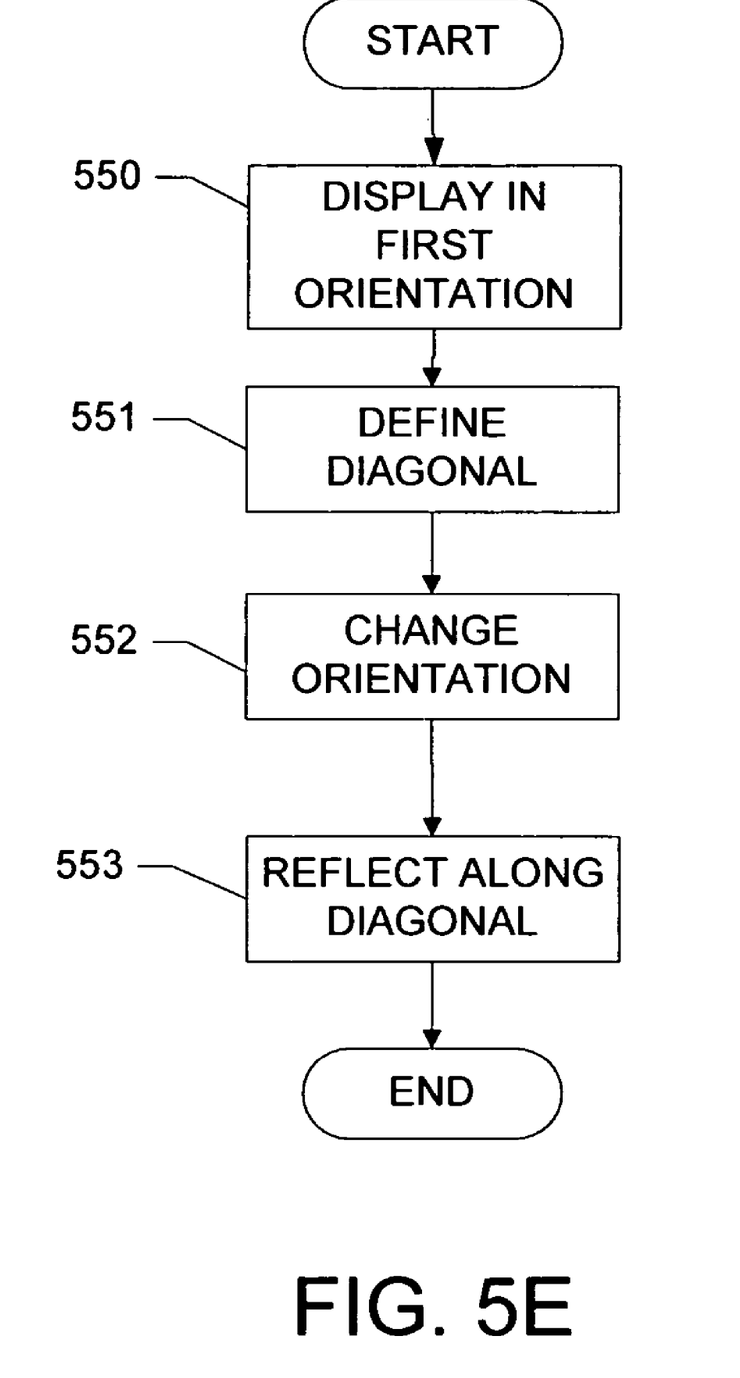

FIGS. 5a-e illustrate an alternative approach to rearranging icons in response to a change in orientation, with FIG. 5e containing an example process flow diagram for this approach. As illustrated in FIG. 5a and in the process of FIG. 5e, a GUI desktop 500a may first be displayed in a first orientation (e.g., landscape) at step 550 with a number of icons 501-512. The icons 501-512 need not be restricted in their placement, so they need not be placed in any particular order, and need not be aligned to any grid. In placing the icons 501-512, according to this example or in any other aspect described herein, the user's computer system may maintain in memory a table or other data structure identifying coordinates of the various icons, and other information regarding icon status and/or appearance. These coordinates may be Cartesian, radial, or any other desired coordinate system.

To prepare for, or in response to, a change in the orientation, the computer system may define a diagonal on the desktop in step 551. The diagonal may be internally determined by the system, and may be displayed if desired. As shown in FIG. 5a, the diagonal 513 extends from an upper-left corner of the desktop to the lower-right corner. Other types of diagonals may be used as well, such as running between the upper-right and lower-left corners, or running between two other points along the periphery of the desktop.

When the desktop orientation is changed in step 552, such as from the landscape orientation 500a to the portrait orientation 500b shown in FIG. 5b, the system may use this diagonal 513 to adjust the location of the icons in step 553. When the desktop orientation is changed, the diagonal 513 placement may remain the same (e.g., the diagonal 513 is shown extending between the upper-left and lower-right corners of the desktop in both orientations), and the icons 501-512 may be relocated according to a reflection along diagonal 513 from the original orientation in FIG. 5a.

The reflection may be done in a variety of ways. For example, if the system employs a Cartesian coordinate system and stores X- and Y-values for placement of the icons 501-512, the reflection may be accomplished by converting (if needed) the coordinates to have the coordinate system origin (0,0) located at one endpoint of the diagonal 513 (e.g., the upper-left corner), and then exchanging the X- and Y-values when in the new display mode. So for example, if icon 511 happens to be located at coordinates (400,−200) (e.g., 400 pixels to the right of the upper-left corner, 200 pixels down from that corner), the new placement may be located at coordinates (−200,400) in the new orientation (e.g., 200 pixels to the right of the upper-left corner, 400 pixels down from that corner). Accordingly, a row of icons in the first orientation may become a column of icons in the second orientation, and a column of icons in the first orientation may become a row of icons in the second orientation, where rows are horizontal and columns are vertical.

This reflection may also be accomplished through other geometric approaches. For example, and as illustrated in FIGS. 5c and 5d, the system may identify a point A along the diagonal 513 from which a perpendicular line intersects the icon being reflected 511, and the distance D between that point and the icon. In the new orientation, as shown in FIG. 5d, the system may place the icon 511 along the same point A on the diagonal, but at a distance D going the opposite direction.

Figure 6A:
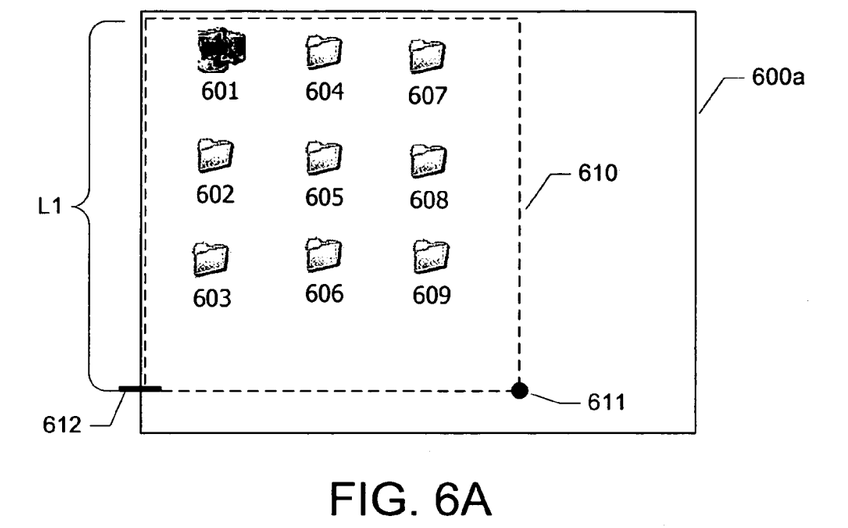
FIGS. 6a-c illustrate GUI desktops and an example process for another approach to handling changes in desktop orientation.
Figure 6B:
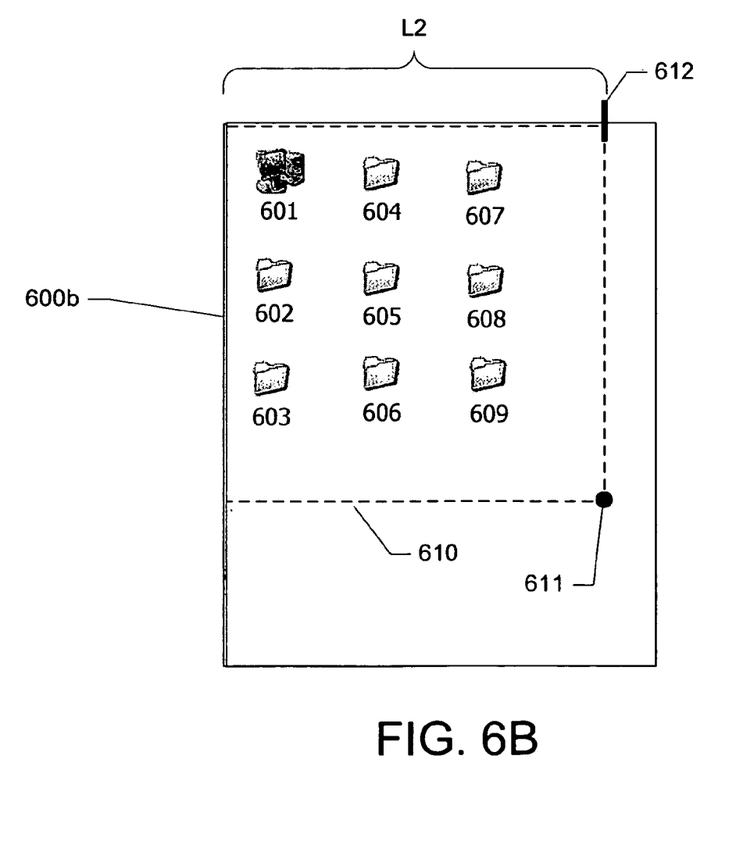
Figure 6C:
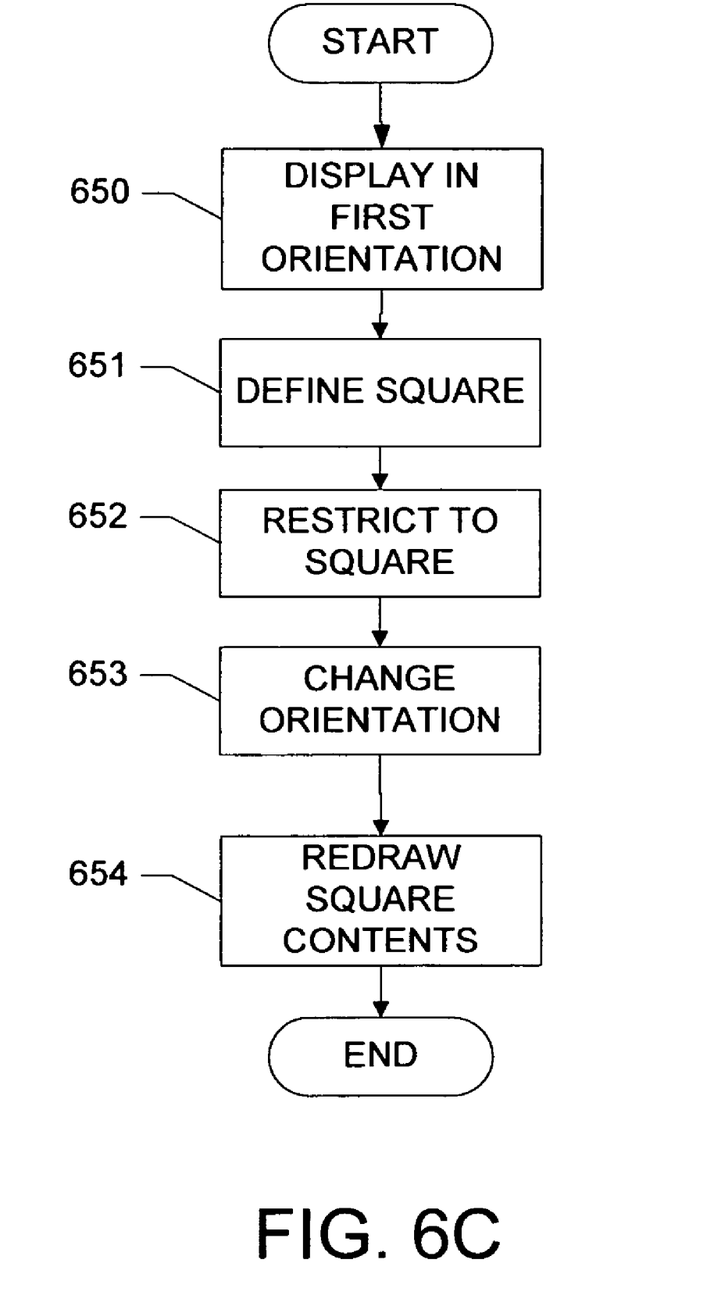

FIGS. 6a-c illustrate another example approach to managing icons in response to changes in desktop orientation, with FIG. 6c illustrating example process steps. At first, the desktop and icons 601-609 may be displayed in a first orientation in step 650, such as the landscape orientation in FIG. 6a. The user, in step 651, may then define a square region 610 of the desktop that will be preserved upon changing the desktop orientation. This may be done in any of a variety of ways, such as by a user clicking and dragging a pointer to define a square, or by designating one or more corner points 611 for the square (with a predetermined corner point, such as an upper-left corner of the screen, being automatically defined when only a single corner point 611 is designated), or activating a mode selection that uses a predetermined region 610.

Alternatively, the square 610 may be defined using a slidebar 612 that is movable along the shorter edge of the rectangular landscape screen. The user may move the slidebar 612 using a pointer, cursor keys, or the like, and in response to the positioning of the slidebar 612, the system may automatically designate square region 610 based on a distance between the slidebar 612 and a predetermined edge of the desktop. For example, the top edge of the desktop may be designated as an origin for the slidebar 612 in landscape mode, with the square region 610 having edges of length L1 measured from this origin, and the left edge as an origin in portrait mode, with the square region 610 having edges of length L2.

As a further alternative, the square 610 may be defined automatically by the system using a predetermined size. For example, the system may automatically define square region 610 to be a square having an edge length equal to the shorter side of a rectangular display. Or, the user may be prompted to enter a numerical value (e.g., pixels, inches, etc.) identifying a size of the square region.

With the square region 610 defined, the system may then, in step 652, restrict placement of icons 601-609 to within the region 610. This restriction, as with other restrictions described herein, may be accomplished in a variety of ways. For example, a user may simply be prohibited from placing a new icon in a restricted area of the screen, and attempts to do so may result in an automatic placement of the new icon in a permitted area of the screen (e.g., the new icon may appear at a location in the permitted area that is closest to the restricted location originally designated by the user), or not at all.

The system may maintain coordinate information for the icons 601-609 that are located within the region 610, indicating the icons' relative positions within the region 610. This coordinate information may, for example, identify positions with respect to an origin associated with the region 610 (such as a Cartesian coordinate using the region's lower-left corner as the origin). When, in step 653, the orientation is changed (e.g., rotated 90 degrees), the system may redraw the same region 610 and icons 601, without rotation, in step 654. Alternatively, the region 610 need not be rendered onscreen, and may instead be an internal structure defined by the system.

Figure 7A:
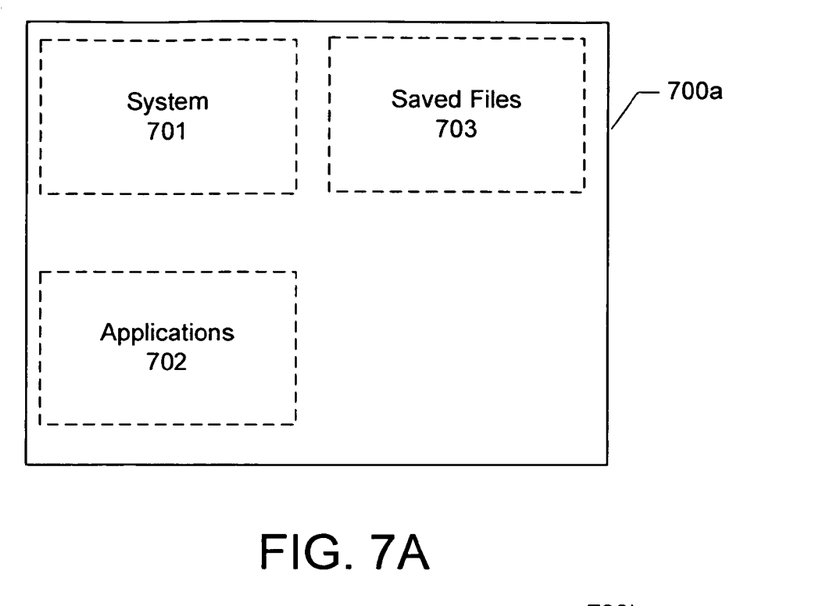
FIGS. 7a-b illustrate GUI desktops for another approach to handling icon placement among different desktop orientations.
Figure 7B:
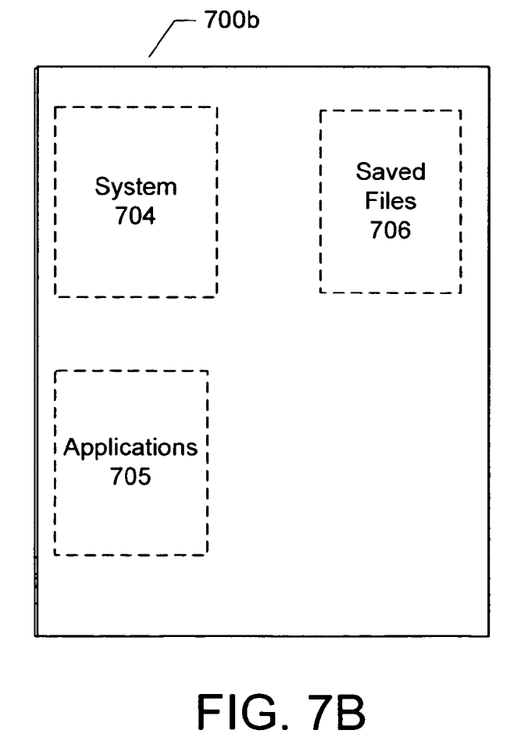

FIGS. 7a-b illustrate examples of a rules-based approach to managing changes in desktop orientation. In this approach, icons may be divided into categories, with one or more rules assigning specific categories to different regions on the desktop. For example, the categories can be based on an object type represented by the icon. Some icons may represent system objects, such as a hardware configuration tool, performance tools, shortcuts, etc.; some icons may represent software applications loaded onto the computer system; and other icons may represent data files saved by the user, such as word document files, pictures, etc. The categories can be defined based on other criteria, as well. For example, icons may be categorized based on other attributes, such as file size, age, creation date of the objects they represent, etc.

The system may permit the user to designate areas of the desktop as being reserved for icons of certain types. For example, the user could use a mouse pointer to define a custom area of the desktop, and may enter a command (e.g., a menu command, a keyboard command, etc.) to assign the custom area to one or more icon types. As illustrated in FIG. 7a, this example desktop includes a system icon area 701, applications icon area 702, and saved files icon area 703. The areas may be displayed on the desktop, such as with a different color, appearance, and/or outline, or they may simply be internal areas that are not displayed as part of the desktop.

When new icons are added to the desktop, the system may automatically place icons in a predetermined area based on the icon type and the area criteria. So in the illustrated example, a new icon for a data file may automatically be placed in, or restricted to, area 703.

To support this rules-based approach, the system may store information identifying one or more icon types that are permitted for a particular area, and the area of the screen, and the system may compare a new icon's type with that criteria to determine where the icon should appear.

Each region identified in a first orientation may also have a corresponding region defined for one or more additional orientations, such that a matched pair of regions exists between the different desktop orientations. The pairs of regions may be identical in dimension and/or size, or they may be adjusted to have different sizes based on user preference or the desktop orientation. As shown in FIG. 7b, the user may designate regions 704, 705 and 706 in portrait view 700b as being reserved for system icons, application icons and saved file icons, respectively, which correspond to regions 701, 702 and 703 in landscape view 700a. The criteria and rules defining these regions may all be stored in a common data structure. For example, the system may associate a single icon category (e.g., application files) with multiple areas across different desktop orientations (e.g., area 702 when in landscape mode, and area 705 when in portrait mode).

When the system switches between orientations, it may access the stored rules to identify where the various icons need to be placed in the new orientation, moving icons between matched pairs of regions for the different orientations. In this manner, the user can customize the layout and appearance of the desktop in the different orientations, and can rest assured that they will be able to find icons in the different desktop orientations.

As a further alternative, icons placed on a GUI desktop may be pinned to a predetermined location on a desktop. For example, certain icons may be placed at one or more predetermined locations on a desktop (e.g., one of the corners, a center of an edge, a center of the desktop, etc.), and may be kept at the same location upon a change in orientation. So, for example, an icon pinned to the upper-right corner of a landscape GUI desktop may once again appear at the upper-right corner of the desktop when rotated to portrait mode. If such a pinned icon is used, and a change in orientation results in an attempt to place an icon overlapping the pinned icon, the pinned icon may remain in its place, and the other icon may be automatically relocated to another location, such as a nearest available open area on the desktop.

Using one or more of the features and approaches described above, a user's experience with changing desktop orientations can be improved. Although the description above provides illustrative examples and sequences of actions, it should be understood that the various examples and sequences may be rearranged, divided, combined and subcombined as desired. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim the following:

1. One or more computer readable storage media having stored thereon computer-executable instructions for performing a method for placing icons on a graphical desktop when changing orientations, comprising the steps of:

defining a subset region in a first orientation of the graphical desktop, the graphical desktop being rectangular and having a long side and a short side, wherein the subset region has a length and width both equal to or shorter than a length of the short side of the graphical desktop, and wherein the subset region encompasses a plurality of pixels, wherein the dimensions of the subset region are defined by receiving user input that moves a slidebar along an edge of the graphical desktop;

placing a plurality of icons in the subset region of the first orientation, wherein said placing restricts placement of said icons to within the subset region of the graphical desktop;

changing said graphical desktop from said first orientation to a second orientation by rotating the graphical desktop ninety degrees; and in response to said changing, redrawing said subset region on said graphical desktop in said second orientation without rotating the subset region such that the top side of the subset region in the first orientation is also the top side of the subset region in the second orientation, and replacing the plurality of icons on the graphical desktop in the second orientation such that the icons in said subset region maintain the same relative spatial relationship between each of the plurality of icons with both of said first and second orientations.

2. The one or more computer-readable storage media of claim 1, wherein said subset region is a square region.

3. The one or more computer-readable storage media of claim 1, wherein said step of restricting further comprises the step of, in response to receiving a request to place a new icon in a first area of said graphical desktop outside of said subset region, automatically displaying said new icon in a second area of said graphical desktop inside of said subset region.

4. The one or more computer-readable storage media of claim 3, wherein said step of automatically displaying further comprises the step of selecting said second area based on proximity to said first area.

5. A method performed by a processor of a computing system for placing icons on a graphical desktop when changing orientations, comprising the steps of:

defining a subset region in a first orientation of the graphical desktop, the graphical desktop being rectangular and having a long side and a short side, wherein the subset region has a length and width both equal to or shorter than a length of the short side of the graphical desktop, and wherein the subset region encompasses a plurality of pixels, wherein the dimensions of the subset region are defined by receiving user input that moves a slidebar along an edge of the graphical desktop;

placing a plurality of icons in the subset region of the first orientation, wherein said placing restricts placement of said icons to within the subset region of the graphical desktop;

changing said graphical desktop from said first orientation to a second orientation by rotating the graphical desktop ninety degrees; and in response to said changing, redrawing said subset region on said graphical desktop in said second orientation without rotating the subset region such that the top side of the subset region in the first orientation is also the top side of the subset region in the second orientation, and replacing the plurality of icons on the graphical desktop in the second orientation such that the icons in said subset region maintain the same relative spatial relationship between each of the plurality of icons with both of said first and second orientations.

6. The method of claim 5, wherein said subset region is a square region.

7. The method of claim 5, wherein said step of restricting further comprises the step of, in response to receiving a request to place a new icon in a first area of said graphical desktop outside of said subset region, automatically displaying said new icon in a second area of said graphical desktop inside of said subset region.

8. The method of claim 7, wherein said step of automatically displaying further comprises the step of selecting said second area based on proximity to said first area.

9. A system comprising a processor and memory, wherein the memory stores computer executable instructions which when executed by the processor perform steps for placing icons on a graphical desktop when changing orientations, comprising the steps of:

defining a subset region in a first orientation of the graphical desktop, the graphical desktop being rectangular and having a long side and a short side, wherein the subset region has a length and width both equal to or shorter than a length of the short side of the graphical desktop, and wherein the subset region encompasses a plurality of pixels, wherein the dimensions of the subset region are defined by receiving user input that moves a slidebar along an edge of the graphical desktop;

placing a plurality of icons in the subset region of the first orientation, wherein said placing restricts placement of said icons to within the subset region of the graphical desktop;

changing said graphical desktop from said first orientation to a second orientation by rotating the graphical desktop ninety degrees; and in response to said changing, redrawing said subset region on said graphical desktop in said second orientation without rotating the subset region such that the top side of the subset region in the first orientation is also the top side of the subset region in the second orientation, and replacing the plurality of icons on the graphical desktop in the second orientation such that the icons in said subset region maintain the same relative spatial relationship between each of the plurality of icons with both of said first and second orientations.

10. The system of claim 9, wherein said subset region is a square region.

11. The system of claim 9, wherein said step of restricting further comprises the step of, in response to receiving a request to place a new icon in a first area of said graphical desktop outside of said subset region, automatically displaying said new icon in a second area of said graphical desktop inside of said subset region.

12. The system of claim 11, wherein said step of automatically displaying further comprises the step of selecting said second area based on proximity to said first area.

* * * * *